United States Patent [19]
Pitio et al.

[11] Patent Number: 5,834,980
[45] Date of Patent: Nov. 10, 1998

[54] METHOD AND APPARATUS FOR SUPPLYING SYNCHRONIZATION SIGNALS SECURING AS CLOCK SIGNALS WITH DEFINED PHASE RELATIONSHIPS

[75] Inventors: Walter M. Pitio, Old Bridge; Donald D. Shugard, Middletown, both of N.J.

[73] Assignee: Lucent Technologies Inc., Murray Hill, N.J.

[21] Appl. No.: 268,752

[22] Filed: Jun. 30, 1994

Related U.S. Application Data

[63] Continuation-in-part of Ser. No. 176,555, Jan. 3, 1994, abandoned.

[51] Int. Cl.$^6$ ........................................... H03L 7/07
[52] U.S. Cl. ............................. 331/2; 331/1 A; 331/49; 331/57; 327/150; 375/376
[58] Field of Search .................... 331/1 A, 2, 14, 331/17, 18, 49, 55, 57, 173; 327/142, 147–150

[56] References Cited

U.S. PATENT DOCUMENTS

| | | | |
|---|---|---|---|
| 5,289,138 | 2/1994 | Wang | 331/49 |
| 5,373,254 | 12/1994 | Nakauchi et al. | 331/1 A |
| 5,463,351 | 10/1995 | Marko et al. | 331/1 A |
| 5,608,357 | 3/1997 | Ta et al. | 331/57 |
| 5,610,558 | 3/1997 | Mittel et al. | 331/2 |

*Primary Examiner*—David Mis

[57] ABSTRACT

A method and apparatus for recovering the time base of signals which change at periodic intervals is disclosed. The apparatus comprises gated voltage controlled oscillators (GVCO) that are alternated or exchanged, to reduce phase and frequency deviations in the recovered time base signal, such as the deviations induced by inherent GVCO differences. Each GVCO is stabilized by a respective phase locked loop. The respective GVCOs are gated only in response to a chosen polarity transition in the input signal, to make the circuit more tolerant of waveform distortions. More than two GVCOs may be used to provide improved frequency drift resistance. The circuit uses resynchronization control signals, such as the time slot signal in synchronous switching systems, to indicate resynchronization or reassignment of the GVCOs in gaps in the data transmission. Automatic reassignment is insured when there are periods of non-transitioning data that last longer than the stability of the GVCOs to prevent frequency drift in the recovered clock.

87 Claims, 6 Drawing Sheets

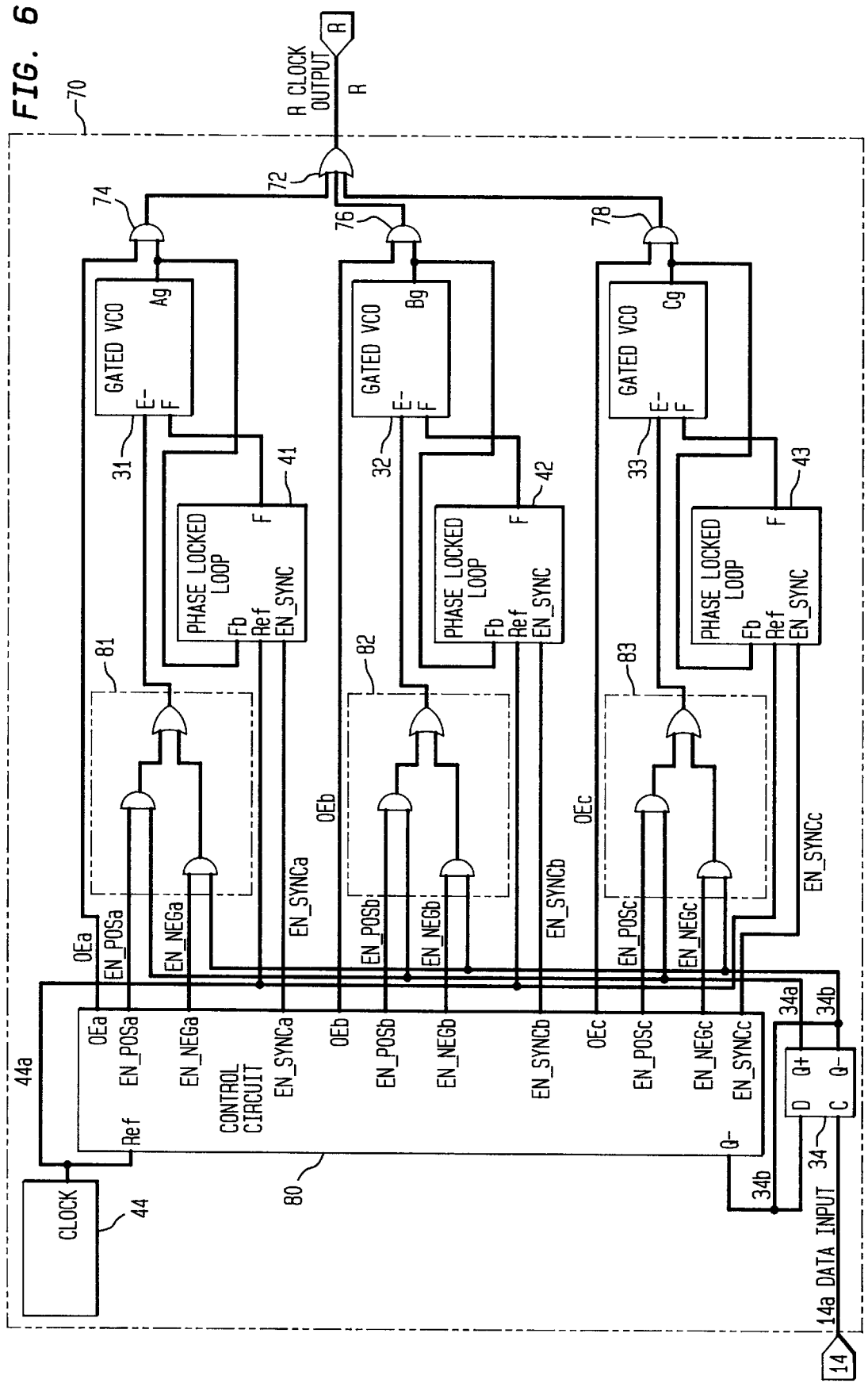

METHOD AND APPARATUS FOR SUPPLYING SYNCHRONIZATION SIGNALS SECURING AS CLOCK SIGNALS WITH DEFINED PHASE RELATIONSHIPS

This application is a continuation-in-part application under 37 CFR 1.62 of prior application Ser. No. 08/176,555 filed on Jan. 3, 1994 now abandoned.

BACKGROUND OF THE INVENTION

1. Field of the Invention

The present invention pertains to circuits providing synchronization signals having a defined phase relationship with respect to an input signal, e.g., a recovered clock. In particular, the present invention pertains to signal processing circuits providing such signals.

2. Discussion of Related Art

In multi-gigabit optical data networks, efficient receivers must be able to acquire bit level synchronization in less than 20 nanoseconds, stay synchronized for 500 nanoseconds, and then be able to again acquire synchronization with another signal source in an equally short time, in some applications. At these speeds, on the far edge of present digital technology, over sampling is not a practical way of assuring clock accuracy. Clock recovery circuits are needed.

U.S. Pat. No. 5,237,290 (the '290 patent) discloses a clock recovery circuit that uses matched variable frequency voltage controlled oscillators (VCOs). The disclosure of the '290 patent is incorporated herein by reference.

In particular, the phase locked loop clock recovery circuit shown in FIG. 8 of the '290 patent, relies on the precise replication of multiple oscillator circuits' physical and electrical characteristics that is possible using integrated circuit production techniques. Because these circuits are only "indirectly tuned", the circuit's oscillators run at somewhat different frequencies. That frequency difference between oscillators will be emphasized, causing frequency drift and possible loss of alignment between the recovered clock and incoming data when the input signal is not transitioning, as it is during unbroken strings of ones or zeros. When transitions are absent from the input signal for a prolonged period and the recovered clock drifts, the recovered clock will be out of phase when the transitions reappear, thereby causing errors until the oscillators can be resynchronized.

Another source of potential errors is caused by the distortion of the data input signal. The main cause of the distortion is the reactance of the transmission media and similar parasitic effects that distort the shape of the analog data signal. Due to the resulting uncertainty over the digitization threshold the effective width of the detected digital data pulses may be greatly reduced.

These distorted data signals also cause other problems in the '290 circuit. A distorted data input will cause a subsequent distorted clock signal with severely narrowed pulse widths. When these pulse widths become too narrow, they cannot be used reliably in the data recovery circuit.

SUMMARY OF THE INVENTION

The present invention produces a synchronization signal for the purpose of sampling an input data signal, and overcomes the prior art limitations of requiring minimum duty cycle and transition density of the input data stream. The invention uses a plurality of oscillatory signals, each of which is adjusted to a reference periodic signal. One oscillatory signal at any one time is connected to the synchronization signal. In response to a selected transition of the input signal, a new oscillatory signal is initiated and phase aligned to the input data pulses and connected to the synchronization signal.

While oscillatory signals are not connected to the output, they can either be disabled or they are being resynchronized to a reference clock signal. This produces a reliable, distortion tolerant, synchronization signal. This synchronization signal has a defined phase relationship with the input signal and is used to sample and recover the data bits received on the input signal. The invention is useful in systems where digitally encoded data must be recovered without the presence of the transmitting data clock. In particular, it is well-suited for use in the regeneration of jittered transmitted data.

One embodiment of the invention assumes that the input data stream consists of active periods during which valid data was transmitted, heretofore referred to as active data, separated by idle periods during which no valid data was transmitted, heretofore referred to as gaps. The time during such gaps can be used to frequency synchronize the oscillatory signals with a reference signal that is known to be in close frequency synchronization with the input data signal.

The oscillatory signals are required to be stable enough to stay in close frequency synchronization with the input data signal for a period of time equal to or greater than the maximum active period. The gaps are required to be long enough to allow the oscillatory signals to be synchronized to the reference signal using techniques well known in the art.

In this embodiment only two oscillatory signals are required. During gaps both oscillatory signals are synchronized to the frequency of a reference signal. During periods of active data the two oscillatory signals are alternatively initiated and connected to the synchronization signal in response to a transition in the input signal having a given polarity. During these active periods, the frequency of these oscillatory signals is maintained by bias signal levels determined during the last gap.

This embodiment is well suited to systems where data gaps are deterministically or statistically allocated. Such systems include synchronous switching equipment that is capable of allocating active data and gaps on a per time-slot basis, totally deterministically. In contrast to the time-locked gaps required for synchronous switching equipment, data LAN systems may statistically provide a certain minimum frequency, distribution and duration of gaps in a data stream. These systems provide codes or some other signal that can trigger a transmission monitor signal indicating when such statistically allocated gaps will occur, for example data header blocks or data terminator blocks.

High reliability requirements for systems such as satellite data link communications equipment and central office frame relay or ATM switching equipment require the use of deterministically allocated gaps in a data stream in response to a periodic signal that guarantee the minimum required duration and frequency of gaps. Burst mode communication links that transmit and receive frames of data such as those used in optical networks and switches can allocate gaps inside each frame, thereby guaranteeing correct synchronization on a per frame basis.

In another preferred embodiment two oscillatory signals are alternately provided to the output, while a third is allowed to be run under the control of its phase locked loop to resynchronize. This additional oscillatory signal is provided so that there is always one oscillatory signal operating in the resynchronization mode. At a given time the resynchronizing oscillatory signal is reassigned to alternatively produce an output synchronization signal and an oscillatory signal previously used to produce the synchronization signal is reassigned to resynchronize. These reassignments are performed systematically for all three oscillatory signals such that each has a turn to resynchronize prior to experiencing any significant drift with respect to the reference signal.

This preferred embodiment produces a reliably phase-synchronized and frequency-tuned synchronization output signal without the presence of gaps in the input data stream. This is advantageous in systems where gaps in the data stream do not exist or cannot be deterministically generated, e.g., those using certain standard communication protocols such as SONET or T3, or those where the overhead for gaps cannot be tolerated.

The preferred embodiments rely on either positive or negative transitions of the input data, rather than both, because it has been found that a lack of symmetry in the input data signal duty cycle is a source of data handling errors. This use of gated voltage controlled oscillators that are phase synchronized by a particular change in the input signal and frequency synchronized to a stable reference, provides a stable regenerated clock signal permitting rapid bit level synchronization of serial communication signals.

This invention can achieve synchrony with as little as one transition in the data stream, allowing it to be used in burst mode or continuous point to point applications. The invention does not require higher speed clocks for over-sampling as is the case in other clock recovery schemes, allowing circuits to be designed to maximize data transfer rates in any given technology. The invention provides a robust clock recovery circuit that is less susceptible to data errors resulting from distortions produced by data signal degeneration and drift.

BRIEF DESCRIPTION OF THE DRAWINGS

The features and advantages of the present invention will be better understood when the Detailed Description of the Preferred Embodiments given below is considered in conjunction with the drawings provided, wherein:

FIG. 6 is a schematic diagram of a three-GVCO clock recovery circuit in accordance with another presently preferred embodiment of the invention;

In these figures, like reference numerals indicate like elements.

DETAILED DESCRIPTION OF THE PREFERRED EMBODIMENTS

Figure 1:
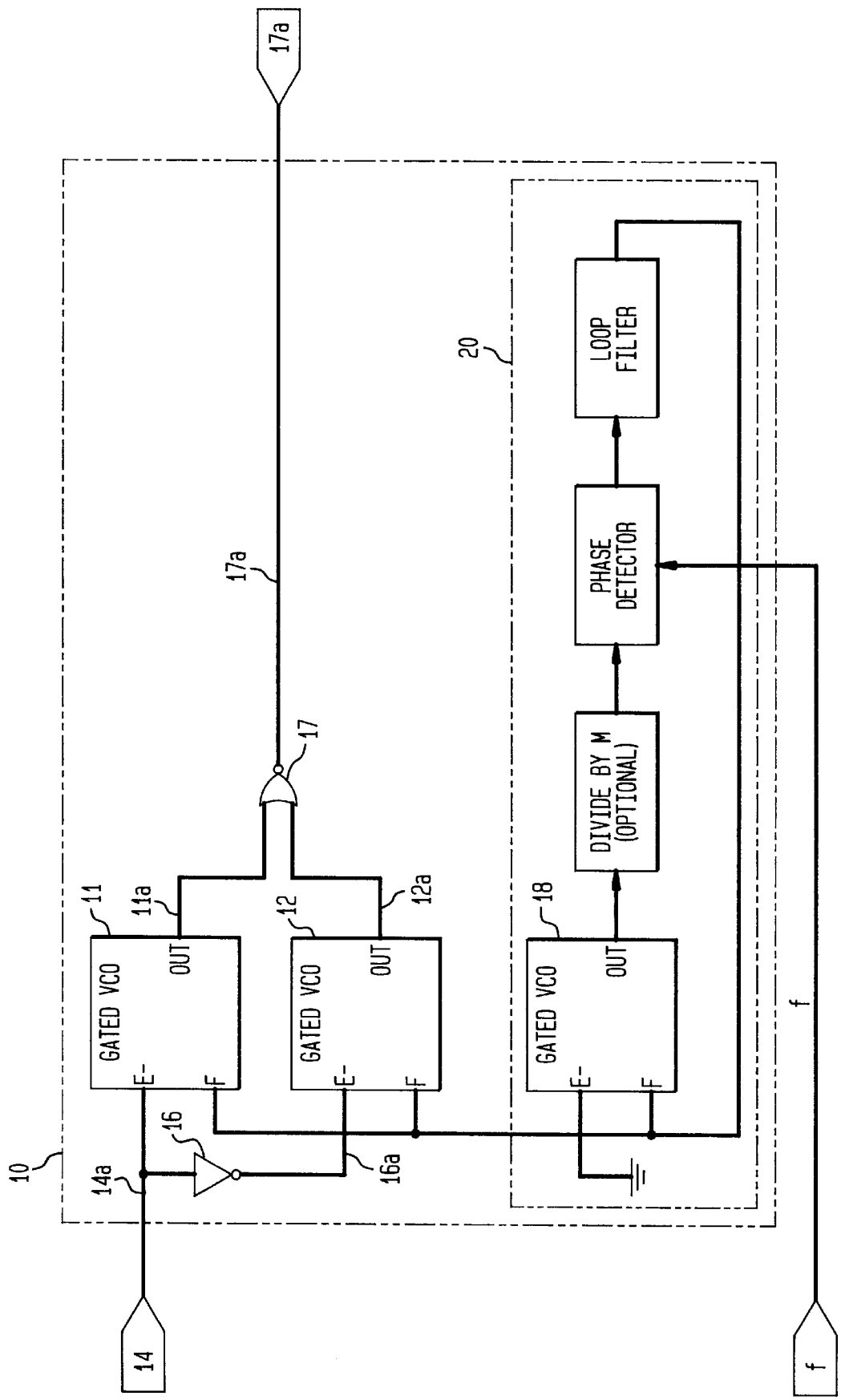
FIG. 1 is a diagram of a gated voltage-controlled oscillator (GVCO) clock recovery circuit, based on the circuit shown in FIG. 8 of the '290 patent.

In the clock recovery circuit 10 of FIG. 1, first and second GVCOs 11, 12 receive complementary full copies of the data signal 14a present at the input 14, through the action of the inverter 16, as in FIG. 8 of the '290 patent. The first GVCO 11 is enabled by the negative going transitions of that signal 14a; the second GVCO 12 is enabled by the positive going transitions of the data signal 14a after they are reversed in polarity by the inverter 16. The frequency of the first and second GVCOs 11, 12 is adjusted by a third, matched GVCO 18 of the associated control circuit 20 including phase-locked loop elements, such as a "phase detector" connected to the reference signal "f". Respective GVCO signals 11a, 12a are output by NOR gate 17 as the synchronization signal 17a.

The prior art clock recovery circuit 10 in FIG. 1 has its advantages, but it is not trouble free. Because the GVCOs 11, 12 are enabled by transitions between digital one and zero data levels, when unbroken strings of digital ones or zeros occur the precise frequency of the individual, enabled GVCO becomes critically important. The frequency of the alternately-enabled GVCOs 11 and 12 is not adjusted based on their actual, individual frequency but rather on the frequency of a control circuit GVCO 18. This circuit design assumes that the GVCOs 11, 12, and 18 are similar enough that they operate with a negligible frequency difference with respect to each other if they are controlled by the same signal. However, these three GVCOs are not identical and the resulting frequency difference may cause the GVCOs to drift, if long enough unbroken strings of digital ones or zeros occur. This would cause data errors in the receiver using the recovered clock, when transitions reappear in the data signal.

Figure 2:
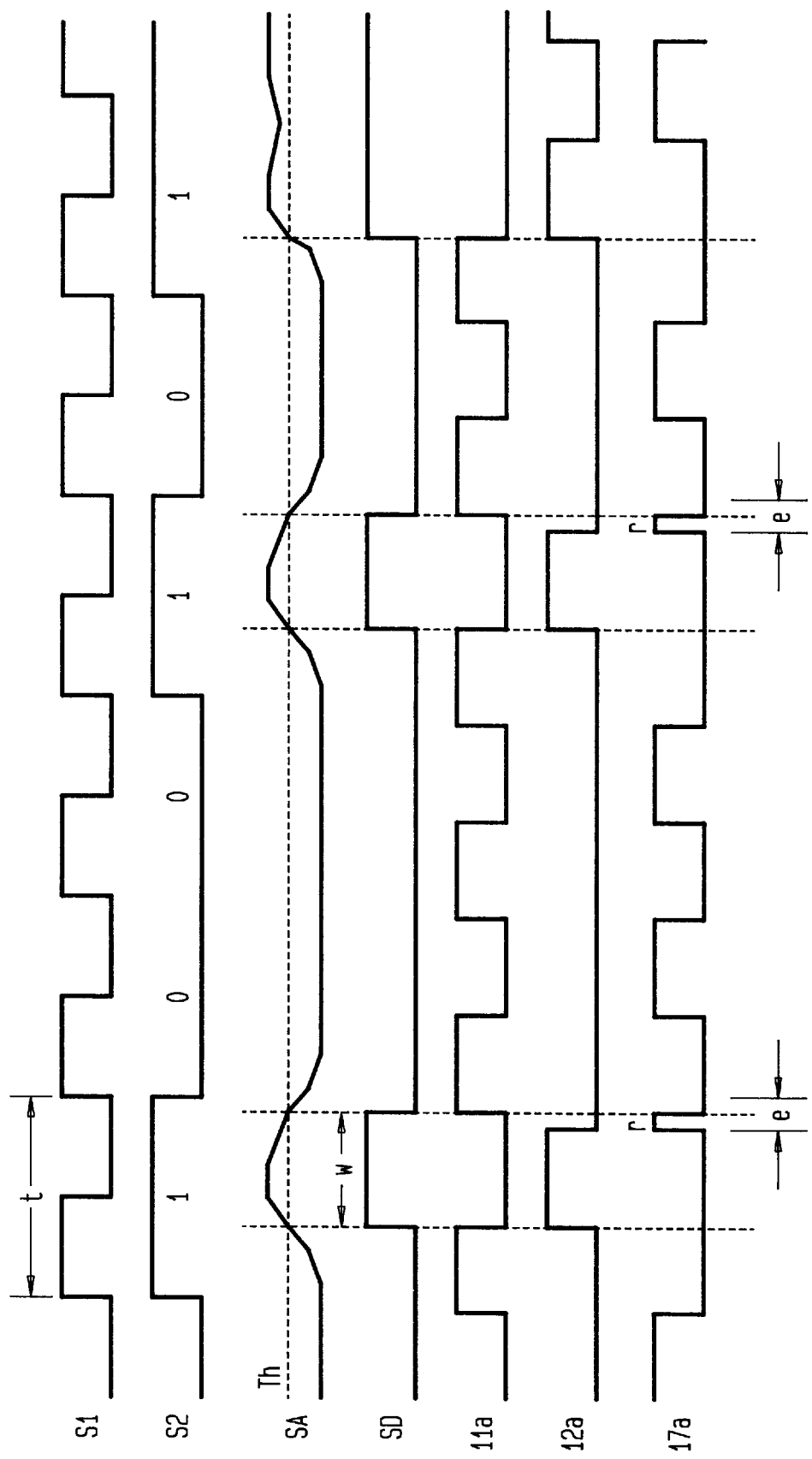
FIG. 2 is a timing diagram showing the generation of runt clock pulses in the circuit shown in FIG. 1, without gate delays, to more clearly illustrate causal relationships between signals.

The problem of signal waveform distortion is even more serious for this prior art circuit 10. For example, in FIG. 2 a "symmetrical" clock signal S1 and a digital data signal S2 having the same clock period "t" produce an asymmetrically distorted signal "SA" when the signals are transmitted in a given network. FIG. 2 also shows the threshold level "Th" at which a receiving device detects transitions in the input signal that the device uses to generate the digitized input signal SD. The distorted leading and trailing edges of the data pulses result in a significantly narrowed pulse width "w" in the digitized input signal SD in contrast to the original pulse width "t" of signal S2.

Applying the signal SD with its reduced pulse width "w" as the input signal 14 in circuit 10 of FIG. 1. yields signals 11a and 12a. The logical NORing of signals 11a and 12a by NOR gate 17 produces signal 17a. The resulting signal 17a has a severe problem in that the first clock pulse after the first positive transition of signal 14a is not a full clock pulse width "t/2". This runt pulse has a pulse width "r" as seen in FIG. 2.

If the runt pulse were to be considered a 50% duty cycle clock it would have an effective clock period "e". The effective clock period "e" of these runt pulses "r" is substantially shorter than the nominal data clock period "t". Thus the receiver must be able to operate faster than the frequency of the data clock to maintain synchrony with the effective frequency of the substantially shorter pulse widths of such distorted signals. In theory, clock pulses produced from digitized data pulses having a width that is exactly 50% of the width of the data's actual clock period "t" will produce output clock pulses having effectively a zero pulse width, and an infinitely fast effective frequency!

Figure 3:
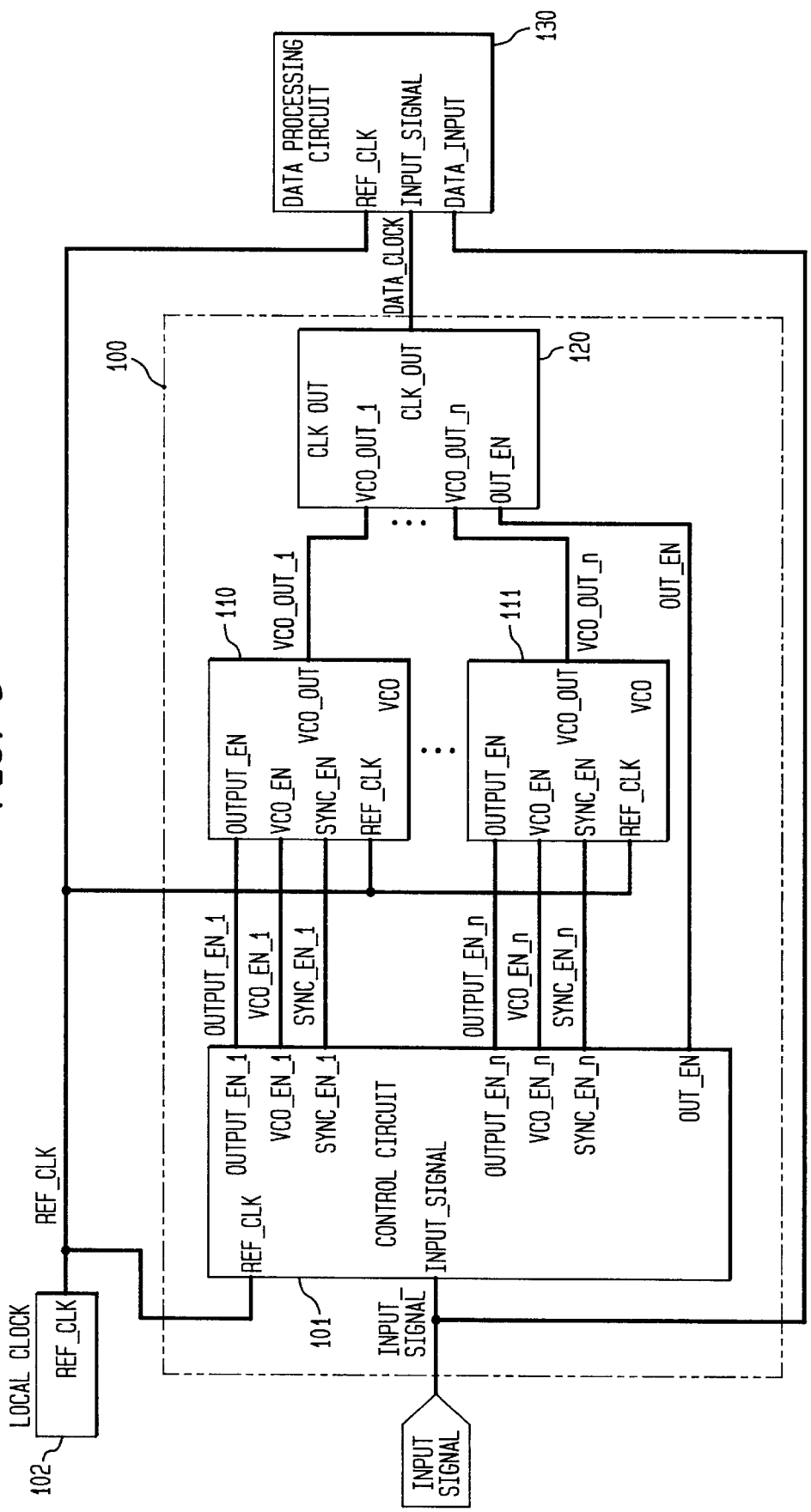
FIG. 3 is a high-level schematic block diagram of multi-GVCO clock recovery apparatus.

FIG. 3 shows a high level block diagram of a multi-GVCO clock recovery system based on this invention. Circuit 100 receives the data input along with a reference clock that is generated locally by local clock generator 102.

The output of circuit 100 is a synchronization signal that has a defined phase relationship to the input data. By generating a synchronization signal that is in phase synchronization with the input data, a data processing circuit can use the synchronization output signal from circuit 100 to define the bits of data on the received input data signal. To remove jitter the data processing circuit may also need to receive the reference clock signal, or alternately have its own internal clock generator circuit.

Circuit 100 consists of multiple voltage controlled oscillator blocks 110 and 111. Various embodiments are possible, each possessing two or more oscillator circuits. Each voltage controlled oscillator includes an output enable circuit that is controlled by the OUTPUT_EN signal, allowing the output to be selectively enabled or disabled. Each voltage controlled oscillator can be selectively enabled to run or be gated in response to the VCO_EN input signal, and when enabled each oscillator is phase aligned with the enable signal. Hence the oscillators in these blocks are referred to as Gated Voltage Controlled Oscillators GVCOs. Each oscillator block also includes a synchronization circuit, such as a phase locked loop, that is capable of frequency synchronizing the oscillator to a reference clock input signal REF_CLK. The oscillator block is put into synchronization mode when the SYNC_EN signal is asserted. Circuit 101 controls all of the enable signals to all of the GVCOs. Circuit 101 controls the GVCOs so that at any time when valid data is being received on the input signal, one GVCO is providing the VCO_OUT signal that is used to generate the DATA_CLOCK output signal of circuit 100. Circuit 100 also must switch which GVCO is providing the VCO_OUT signal that is generating the DATA_CLOCK to prevent the GVCOs from drifting.

Each time that the GVCOs are switched, and the enable signals are asserted and de-asserted in response to transitions of the input signal, the enabled GVCO is phase aligned with the input signal. In addition, circuit 101 has to allow each GVCO to frequency resynchronize to the reference clock signal often enough to prevent the GVCOs' frequencies from drifting beyond a tolerable range.

The outputs of the GVCOs are combined into a single data output clock in circuit 120. Circuit 120 can also be selectively disabled through the OUT_EN signal generated by circuit 101. This is potentially necessary if all of the GVCOs are resynchronizing to ensure that glitches or erroneous synchronization signals are not output on the DATA_CLOCK signal.

Circuit 130 can be one of a variety of data processing circuits. Common examples include a data parallelization circuit, a serial channel repeater, a continuous periodic clock signal generator for discontinuous signal sources, etc. Circuit 130 receives the DATA_CLOCK output signal of circuit 100 and uses it to define the bits of data on the input signal. Depending on system requirements, circuit 130 may also need to receive the local reference clock signal.

The invention is particularly well-suited for generating a data clock to recover data from a jittered transmitted signal. This is illustrated by the dejitterizing data parallelization circuit of FIG. 5.

In a particular embodiment it is also well-suited for systems where a continuous clock has to be generated from a non-continuous or bursty clock source. The invention performs this function by simply receiving the bursty clock source in the input signal, and the synchronization output signal would generate the continuous clock.

Figure 4:
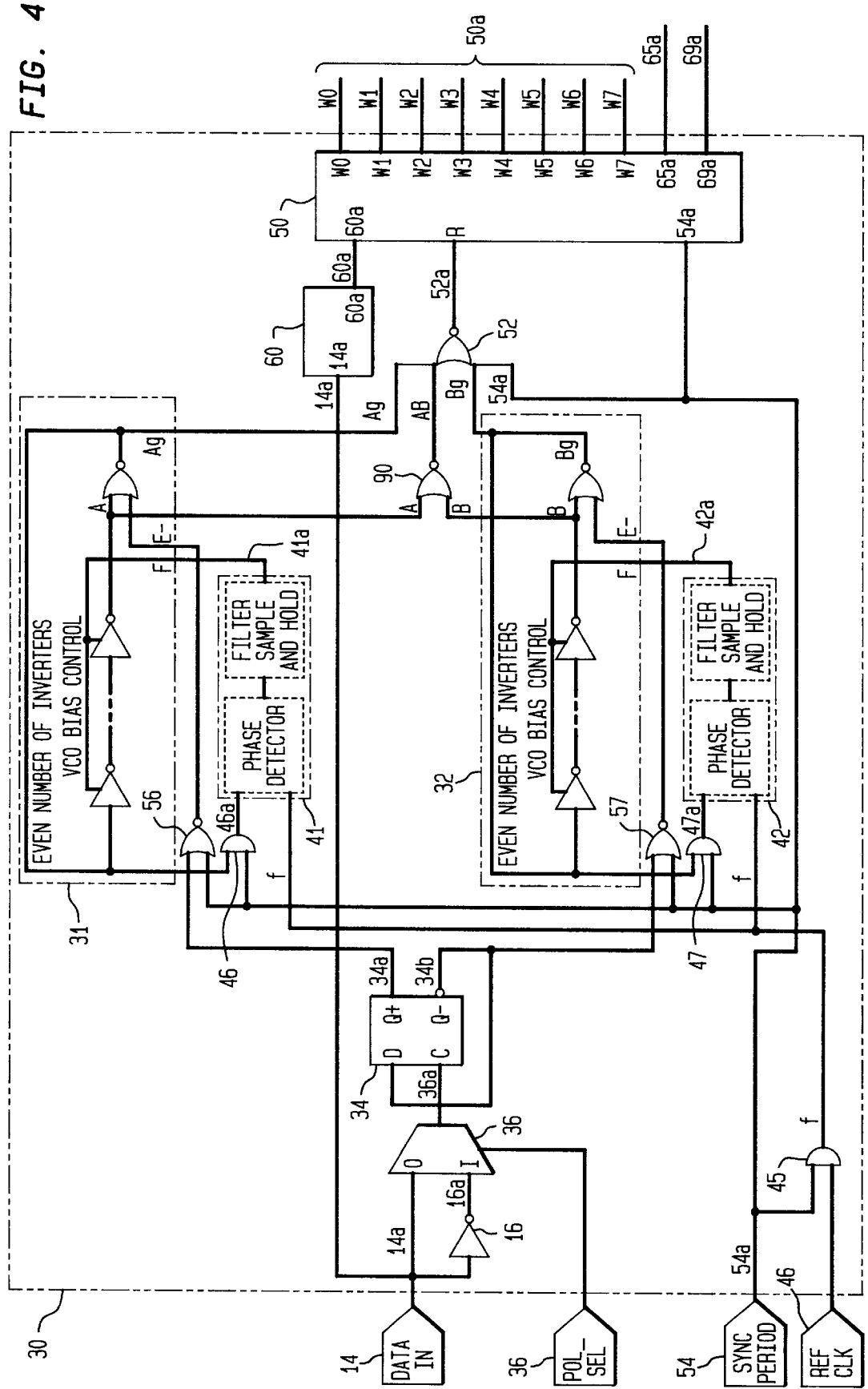
FIG. 4 is a schematic diagram of a two-GVCO clock recovery circuit in accordance with a presently preferred embodiment of the invention.

FIG. 4 shows a clock recovery circuit 30 in accordance with a first preferred embodiment of the present invention.

The two GVCOs 31, 32 are enabled by the "Q+" and "Q−" outputs of a bistable, flipflop 34, respectively. Because the inputs "E−" of the GVCOs 31, 32 in this circuit are enabled by the flipflop's "Q+" and "Q−" outputs, they respond only to the positive going transitions in signal 36a. Furthermore, the GVCOs 31, 32 are alternately enabled by those positive going transitions through the control of signals 34a and 34b generated at the "Q+" and "Q−" outputs of the bistable 34.

A polarity selector 36 is also provided in this embodiment. The polarity selector, controlled by the "POL_SEL" input, connects either the signal 14a or its inverse 16a to the bistable 34. Reversal of the polarity of the data input signal 14a is helpful in the event that the distortion of the transmitted signal is significantly asymmetric. Specifically, circuit performance is improved when polarity is selected so that the leading edge of the shorter duty cycle pulse enables the GVCOs.

The frequency of each GVCO is synchronized by respective Phase Locked Loop (PLL) 31, 32 outlined in phantom. Each PLL has a phase detector and a sample-and-hold filter that provide a signal 41a, 42a to the frequency control input "F" of a respective GVCO 41, 42, in any suitable manner well known in the art. Each phase detector is supplied with a reference frequency signal "f". The reference frequency "f" is supplied by a local source on the "REF_CLK" input signal.

However, here the reference frequency "f" is supplied through the AND gate 45 to the PLLs 41, 42, when a transmission monitor signal "SYNC_PERIOD" 54a is active, indicating that data is absent from the input signal 14a. Also, the respective signals "Ag" and "Bg" output by each GVCO are supplied to the PLL 41, 42 by AND gates 46, 47, and both GVCOs 31, 32 are enabled through NOR gates 56, 57, in response to the control signal 54a.

The VCO Bias Control signals 41a, 42a produced for the GVCOs by their respective phase-locked loops 41, 42 are maintained at the levels that existed before the gap ended by the respective sample and hold circuits in the PLLs. Thus, the "SYNC_PERIOD" input signal can allow the GVCOs to synchronize directly to the reference frequency "f" by the PLL 41, 42, when data is absent at the input 14.

The "SYNC_PERIOD" signal is also used to disable the synchronization signal at the output gate 52 when the GVCOs are resynchronizing.

Hazard Avoidance

There is a classic logic hazard that is well understood in the prior art that exists in a particular preferred embodiment of the invention. The hazard stems from the fact that two clock enabling NOR gates of GVCOs 31 and 32 are logically NORed by NOR gate 52. The timing in the circuit may be such that an erroneous runt pulse is generated at the output 52a when the GVCOs are switching in response to input signal 14a. In accordance with this technique, a NOR gate 90 is added to the circuit to avoid the logic hazard.

However, since the signals Ag, Bg output by the GVCOs 31, 32 are gated, the GVCO outputs Ag, Bg are not suitable as inputs to the classic "third NOR" gate 90. To resolve this problem, internal taps for ungated oscillator outputs A, B are provided within the GVCOs 31, 32 in accordance with this feature of the present invention, before the enabling signals E− are NORed with signals A and B.

Data Paralleling

Clock recovery circuit 30 operates by generating a sequence of clock pulses in response to a sequence of data input bits. When data is present, the synchronization signal 52a is connected to the input "R" of data paralleling circuit 50 by output logic, here a NOR gate 52. By using synchronization signal 52a the paralleling circuit 50 can eliminate the jitter found in the input data, because GVCOs 31 and 32 were phase aligned with the data on each data input transition of a certain polarity. An input bit "d" is phase aligned with its corresponding generated synchronization pulse "c".

Due to the delays associated with the synchronization signal circuitry, the input data bit "d" will occur on signal 14a prior to pulse "c" occurring on output signal 52a. The data transition "d" is delayed by circuit 60 using techniques well known in the art such that the delayed data bit is aligned exactly to meet the setup and hold time of circuit 50 as it is being clocked by synchronization pulse "c". In addition the delay circuit must correctly compensate for propagation delay such that the resulting clock pulse is correlated exactly to the transition in the data input signal that generated it. This is necessary to correctly eliminate jitter in circuit 50. Through this technique, data signal 60a and synchronization signal 52a may still appear to jitter when observed externally; however, when observed relative to each other, their jitter is synchronized, and the phase relationship between signal 60a and 52a can be maintained at a constant.

Figure 5:
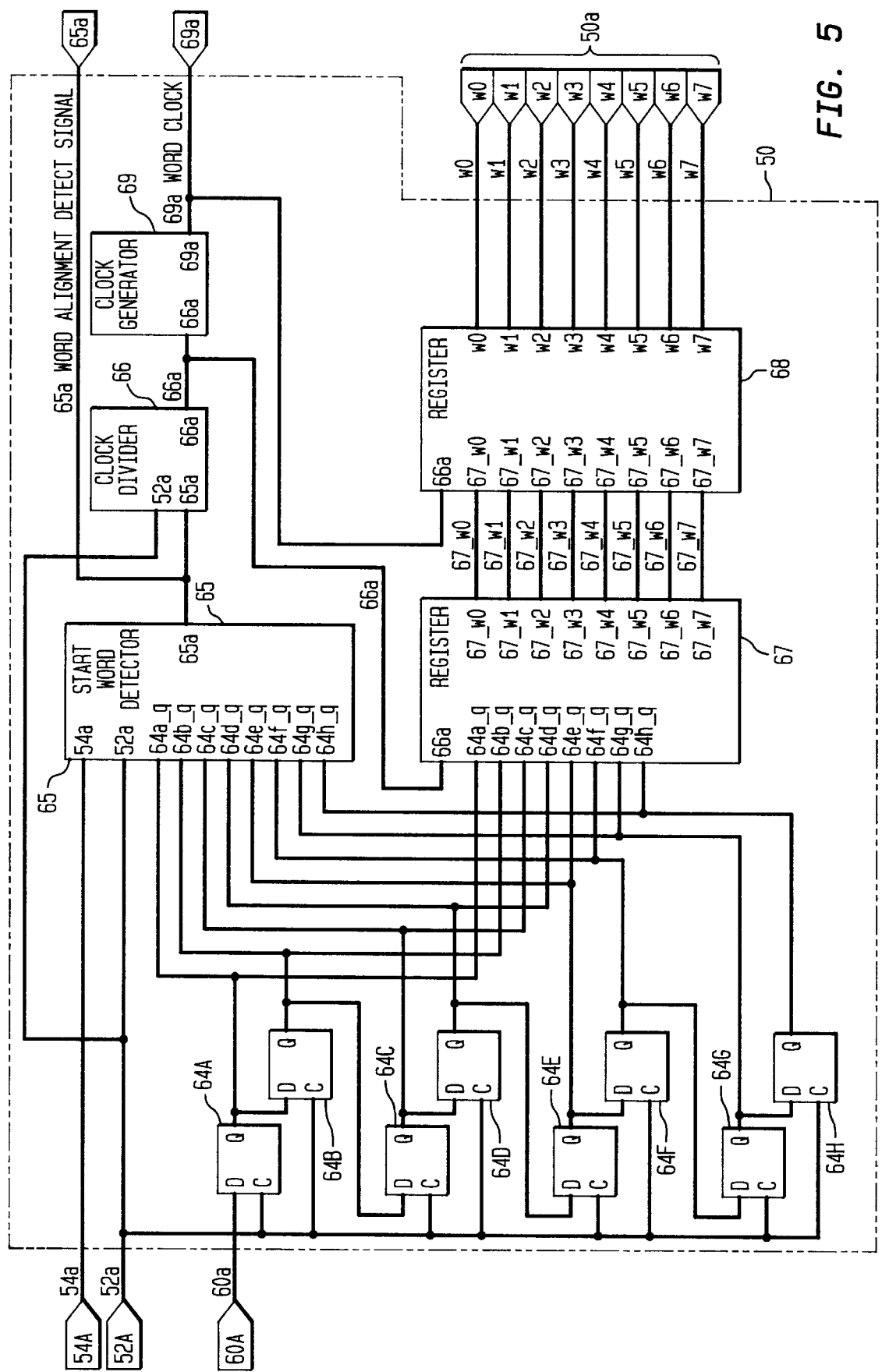
FIG. 5 is a schematic diagram of the FIG. 4 paralleling circuit.

FIG. 5 shows the processing of the delayed input signal 60a into 8 bit words in greater detail. Eight sequential clock periods of the delayed signal 60a are clocked into flip-flops 64A through 64H by the recovered signal 52a. The start word detect circuit finds a matching starting word pattern in flip-flops 64A through 64H, and it generates a "WORD ALIGNMENT DETECT SIGNAL" pulse 65a. The signal 65a is used to initialize the clock divider 66 so that it starts generating clock signal 66a at a rate that is one eight the rate of 52a. Signal 66a is directly phase aligned with signal 52a and possesses the same amount of jitter as signal 66a, even though the jitter now encompasses a smaller percentage of the synchronization signal period since the clock has been divided down. Clock signal 66a is used to transfer the eight bits of data from flip-flops 64A through 64H into holding register 67.

Signal 65a can also be used by external circuitry to determine the start of a received burst of data using techniques that are well understood in the art.

Signal 66a is received by clock generator circuit 69 which generates a clean jitter free clock signal 69a that is frequency synchronized with signal 66a, but is jitter free. Signal 69a is not free running, but is rather gated by signal 66a so that the number of pulses generated by circuit 69 onto signal 69a is exactly equal to the number of pulses that circuit 69 receives on signal 66a. This circuit can use a gated phase locked loop or other techniques that are well understood in the art. Signal 69a is used to transfer the data out of holding register 67 into output register 68. The register 68 generates the data word output signals W0 through W7 referred to as 50a as a group. Signal 69a is also provided to the external circuitry. Both signal 69a and data output word 50a are jitter free because they are both frequency and phase synchronized to signal 69a which is jitter free.

Signal 54a indicates when no active data is present at the input signal 14a. During this gap interval the synchronization signal circuit is performing resynchronization, and no synchronization signal is provided on signal 52a into circuit 50. The start word detector 65 is initialized when signal 54a is asserted. When active data appears on signal 14a and signal 54a is de-asserted, start word detector 65 starts to look for the next matching start word pattern.

Since the output 50a of circuit 50 is disabled during gaps in the input data, and it does not resume until a new start word pattern is found in the input data stream, the output of circuit 50 only contains valid active data.

Using Multiple GVCOs

FIG. 6 shows another preferred embodiment, circuit 70, of the invention in which three, GVCOs 31, 32, 33 provide the synchronization signal. The function of this embodiment is in principle similar to that described in FIG. 4; therefore FIG. 6 is a simplified diagram that omits several of the circuit details that are common to both embodiments and emphasizes the circuit differences. Specifically circuits that perform the polarity select function, hazard avoidance, and paralleling functions in FIG. 4 are not present in FIG. 6. It should be obvious to anyone skilled in the art how to modify the circuit embodiment in FIG. 6 to contain the additional circuits in FIG. 4, and/or to modify the 3 GVCOs embodiment in FIG. 6 into a circuit that uses 4 or more GVCOs.

The purpose of this embodiment is to eliminate the need for gaps in the input data stream during which the GVCOs can resynchronize to a reference. Since two GVCOs must provide the synchronization pulses while active data is being received, this embodiment provides an additional GVCO, thereby allowing any of the GVCOs to be resynchronized while two other GVCOs are providing the synchronization signal. The gated outputs of the GVCOs Ag, Bg, Cg can each be adjusted by their corresponding PLL, respectively 41, 42, 43. The output of each GVCO is enabled through an AND gate 74, 76, and 78 under the control of circuit 80. Each GVCO E– input is driven by a logic circuit 81, 82, 83. Logic circuits 81, 82, and 83 select one of the following three operating modes for the E– GVCO enable signal for their respective GVCO: enabled all the time, enabled when signal 34a is low, or enabled when signal 34b is low. Circuit 80 generates the control signals EN_POS and EN_NEG. In FIG. 6 the three sets of control signals are labeled EN_POSa, EN_NEGa that control circuit 81, EN_POSb, EN_NEGb that control circuit 82, and EN_POSc, EN_NEGc that control circuit 83. The three enable resynchronization signals are labeled EN_SYNCa, EN_SYNCb, and EN_SYNCc for GVCOs 31, 32, and 33 respectively. Circuit 80 generates the enable resynchronization signals EN_SYNC that control each of the PLLs. When the EN_SYNC signal is high, the PLLs perform a phase comparison between the output of their corresponding GVCO, and the periodic reference signal 44a. When the EN_SYNC signal is low, the PLLs are disabled and the frequency control output signal F of the PLL is held it its last state when the EN_SYNC signal was high. It is advantageous for the PLLs to initialize their internal phase comparator when the EN_SYNC signal transitions from low to high, using methods and techniques well understood in the art, so as to cancel the initial phase difference between the output of the GVCO and the reference signal 44a. This allows the full synchronization period to be used to adjust the frequency of the GVCO, rather than to re-acquire phase synchrony. Signal 34a and 34b are the output of flipflop 34 and are always complementary. Flipflop 34 is clocked by the input signal 14a and its function is to alternate the states of signals 34a and 34b on every positive transition of signal 14a. At any time during the operation of the circuit 70, control circuit 80 selects a pair of GVCOs which will be referred to as GVCOs "X" and "Y" and enables their outputs by setting the output enable control signal OE high for the corresponding GVCOs. In FIG. 6 the three output enable circuits are labeled OEa, OEb, and OEc corresponding to GVCOs 31, 32, and 33 respectively. The third GVCO which will be referred to as GVCO "Z" has its output disabled under the control of circuit 80 by having its corresponding output enable control signal set low. At the same time circuit 80 chooses the operating mode for the E– input of all three GVCOs. GVCO "Z" is placed in the "enabled all the time" state by setting both its corresponding EN_POS and EN_NEG signals low. Circuit 80 selects GVCO "X" to be enabled when signal 34a goes low. The GVCO "X" has its EN_POS signal set high, and its EN_NEG signal set low. Circuit 80 also sets signal EN_POS low, and EN_NEG high for the "Y" GVCO, thereby causing it to be enabled when signal 34b goes low. Circuit 80 sets the EN_SYNC corresponding to GVCO "Z" high, and sets the EN_SYNC signal for the other two GVCOs low.

The resulting configuration allows GVCO "Z" to be enabled continuously while its corresponding PLL adjusts its frequency to match the periodic reference signal 44a. During this period of time, the output of GVCO "Z" is disabled preventing it from causing any data errors.

The other two GVCOs are alternately enabled as signals 34a and 34b change states on every positive transition of the input signal 14a. Their outputs are enabled and then ORed together through OR gate 72 to generate recovered clock output signal R. On each positive transition of input, either of the pair of GVCO "X" or "Y" produces synchronization pulses that are phase aligned with the input data transition, and in close frequency synchronization to the reference periodic signal 44a. These synchronization pulses continue until the next positive transition of the input signal. This causes the other GVCO of the pair of GVCOs to be enabled thereby producing period pulses, and disabling the previously enabled GVCO.

The function of this pair of GVCOs is identical to the function performed by the GVCOs in FIG. 4 while active data is present on the input. During these active periods, frequency of the respective GVCO signals is maintained by bias signal levels determined during the last time the respective GVCO was assigned as a "Z" unit that is disconnected from the output and permitted to synchronize to the reference frequency.

Alternation/Reassignment

The embodiment in FIG. 6 operates by systematically reassigning which GVCOs are the "X" and "Y" pair, and which GVCO is the "Z". Two requirements have to be met by the reassignments which are controlled by control circuit 80: each of the three GVCOs has to be assigned to be the "Z" GVCO and allowed to resynchronize prior to its GVCO drifting more than an allowable amount with respect to the reference periodic signal, and the "Z" GVCO must be given enough time to synchronize prior to the next reassignment.

An effect well understood in the prior art is that very stable oscillators can allow long periods of time before they drift; however, these same oscillators often also require long periods of time to resynchronize. On the other hand, oscillators with less stability can be resynchronized quickly, but they will also drift after a relatively brief period of time. Choosing the required stability of the oscillators and the corresponding time intervals for reassignments is a standard engineering optimization exercise that is both technology and application dependent and is understood by anyone skilled in the art.

The simplest reassignment strategy is to periodically rotate through all 3 GVCOs, assigning each one to be the "Z" GVCO in turn. Other reassignment patterns, for example pseudo random, can also be used as long as the requirements are met. Embodiments with more than 3 GVCOs can lead to many more reassignment patterns.

The preferred embodiment of circuit 80 in FIG. 6 performs a rotational reassignment using an external clock reference signal 44a to establish a timing base that is used for reassignments. Internally to circuit 80 the reference signal 44a is divided down to generate a periodic reassignment clock signal at the reassignment frequency. The period of the clock has to be long enough to allow a GVCO to resynchronize to the reference periodic signal, and short enough so that each GVCO can perform a resynchronization cycle prior to drifting beyond tolerance. Each time this reassignment clock has a low to high transition a reassignment sequencer is started inside circuit 80 that monitors the state of input signal Q– which is connected to signal 34b in circuit 70, and a timeout counter is started that counts a predetermined number of pulses on signal 44a. The reassignment sequencer knows which GVCOs are performing the "X" and "Y" functions and which GVCO is the "Z" function. The next GVCO to be resynchronized will be referred to as the target GVCO. Circuit 80 also knows whether the "X" or "Y" GVCO is the target GVCO and is to become the next "Z" GVCO. The reassignment sequencer waits until the target GVCO is enabled and then waits for the next transition of signal 34b, indicating that the target GVCO is disabled. When 34b transitions, the reassignment sequencer assigns the target GVCO's function, either "X" or "Y", to the GVCO that is currently the "Z" GVCO, and it assigns the "Z" function to the target GVCO. While this reassignment takes place the third GVCO was providing the synchronization signal. When the reassignment is completed, the timeout counter is initialized, and the reassignment sequencer is put into a state waiting for the next low to high transition of the reassignment clock.

Since the correct operation of the reassignment sequencer is based on the transitions of signal 34b, which itself is derived from the input signal 14a, a mechanism must be provided that allows the circuit to function properly even if long gaps of data exist on the input. If this is not done, then long gaps in the input, would delay the reassignments, and would allow the GVCOs to drift beyond their allowable tolerance. When the data restarts, the GVCOs would not be able to provide a synchronization signal at the correct frequency until all 3 GVCOs were resynchronized. To overcome this potential problem, circuit 80 has a timeout counter that causes the reassignment sequencer to initiate the reassignment when the counter reaches a predetermined count, irrespective of the state of signal 34a. This may cause a single bit error, if in fact the input signal contained valid data that did not contain any transitions. It is therefore necessary to preserve a certain transition density in the input data if no bit errors can be tolerated.

Finally either embodiment can be run in a mode where a single oscillator provides the synchronization signal while one or more oscillators resynchronize. The oscillator will provide the synchronizaton signal for a period of time such that the phase will not drift with respect to the input signal more than a tolerable amount before a different oscillator is enabled to provide the synchronization signal. The switching of the oscillators falls under similar constraints as discussed in previous embodiments. Note that the oscillators are phase aligned to the input signal when they are enabled.

It will be appreciated by one skilled in the art that variations and modifications of the disclosed apparatus are possible within the spirit and scope of this invention. The embodiments described above are provided to illustrate presently preferred ways of making and using this invention. The invention is defined by the claims appended below.

Specifically DeMorgan's Theorem and other Boolean logic techniques can be used by one skilled in the art to modify the types of gates that are used throughout the circuit descriptions into logical and/or functional equivalents.

We claim:

1. A method of producing a signal for synchronization with an input signal, said input signal having selectable transitions and said synchronization signal having a defined phase relationship with respect to the transitions of the input signal, the method comprising the steps of: providing at least two oscillator means each generating an oscillatory signal, producing the synchronization signal by first enabling one of the at least two oscillatory signals in response to a selected transition of the input signal, and selectively enabling one of the two oscillatory signals and then the other oscillatory signal in response to alternatively selected transitions of said input signal so as to provide said synchronization signal.

2. The method of claim 1 further comprising the steps of: selectively enabling the oscillatory signals so as to be synchronized to a reference periodic signal, while at the same time disabling said oscillatory signal that is already selectively enabled to provide said synchronization signal.

3. The method of claim 1, wherein said input signal has selectable polarities within said selectable transitions and wherein said step of producing the synchronization signal by first enabling one of at least two oscillatory signals to provide the synchronization signal is accomplished in response to a transition of only a single selected polarity of the input signal.

4. The method of claim 3 further comprising the steps of: selecting the single selected polarity of the input signal to be either positive or negative.

5. The method of claim 2 further comprising the steps of: determining when gaps exist in the input signal and enabling said oscillatory signals to be synchronized to said reference periodic signal during said gaps of said input signal.

6. The method of claim 2 further comprising the steps of: generating a frequency control signal that controls the frequency of the oscillatory signal, said frequency control signal being generated in response to the phase difference between the oscillatory signal and said reference periodic signal and said frequency control signal having a bias signal level, said frequency control signal being maintained at the last bias signal level that was generated the last time the last oscillatory signal was enabled by said frequency control signal.

7. The method of claim 6 further comprising the steps of: initializing the determination of the phase difference between the reference periodic signal and the oscillatory signal when the oscillatory signal is enabled to be synchronized with said reference periodic signal and only using the phase difference subsequent to said initializing of the phase difference to generate said frequency control signal.

8. The method of claim 1 further comprising the steps of: logically combining said at least two oscillatory signals into a single synchronization signal.

9. The method of claim 5 further comprising the step of: disabling the synchronization signal when said at least two oscillatory signals are being synchronized to said reference periodic signal during said gap in said input signal.

10. The method of claim 1 further comprising the step of: modifying the phase relationship between the input signal and the synchronization signal to be other than that established by said alternatively selected transitions of said input signal.

11. The method of claim 10 further comprising the step of: converting a serial input signal comprising said input signal into parallel word wide output data and generating a synchronization signal that is different than said synchronization signal established by said alternatively selected transitions of said input signal and now has a defined phase relationship with respect to the parallel word wide output data.

12. The method of claim 11 further comprising the steps of: searching for a defined pattern in the serial input signal that signifies the start of a transmission and/or the alignment of data words therein and when the defined pattern is found, groups of two or more data bits from the serial input signal are converted into data of the parallel word wide output, generating a jitter free word synchronization signal having a frequency which is the frequency of the synchronization signal of claim 1 divided by the number of two or more data bits, said parallel word wide data being aligned to be in a defined phase relationship to selected transitions of said synchronization signal having a defined phase relationship with respect to said parallel word wide output data.

13. The method of claim 10 further comprising the steps of: generating a second synchronization signal that is jitter free and that is synchronized to the synchronization signal of claim 1, and aligning the input data signal so that it has a defined phase relationship with selected transitions of the second synchronization signal.

14. The method of claim 10 further comprising the steps of: correlating specific pulses of the synchronization signal of claim 10 with specific input signal transitions, said specific pulses and said specific input signal transitions being phase aligned with respect to each other.

15. The method of claim 2, wherein said at least two oscillatory signals are of a number which is three or more and further comprising the steps of: selecting a pair of oscillatory signals of said three or more oscillatory signals to alternately provide said synchronization signal, said pair of oscillatory signals alternately providing the synchronization signal in response to a selected transition of said input signal, selecting one or more of the remaining three or more oscillatory signals for resynchronizing purposes.

16. The method of claim 15 further comprising the steps of: changing which of the three or more oscillatory signals are selected to be the pair that are alternately providing the synchronization signal, and which of the remaining oscillatory signals are selected for resynchronizing purposes.

17. The method of claim 16 further comprising the steps of: making changes in the selections of said oscillatory signals used for providing said synchronization signal and for said resynchronization purposes in response to a selected transition of the input signal following a first defined interval of time from the last change of said selections.

18. The method of claim 17 further comprising the steps of: selecting said first defined interval of time from the last change in the selections, such that each oscillatory signal selected for said resynchronization purposes causes resynchronization prior to its frequency drifting more than a predetermined tolerable amount.

19. The method of claim 18 further comprising the steps of: changing selections of said oscillatory signals used for providing said synchronization signal and for said resynchronization purposes independently of any input signal transitions if no selected transitions of the input signal occurs following said first defined interval of time and prior to a second defined interval of time from the last change in selections, where the second defined interval of time is longer than the first defined interval of time.

20. The method of claim 19 further comprising the steps of: selecting the second interval of time from the last change in the selections, such that each oscillatory signal selected for said resynchronization purposes causes resynchronization prior to its frequency drifting more than a predetermined tolerable amount.

21. The method of claim 17 further comprising the steps of: selecting said first defined interval of time from the last change in the selections, such that the one or more oscillatory signals selected for said resynchronization purposes cause resynchronization for at least the minimum amount of time required to achieve frequency synchronization with said reference periodic signal.

22. The method of claim 2 further comprising the steps of: selecting an oscillatory signal to provide the synchronization signal, and selecting one or more of the remaining oscillatory signals for resynchronization purposes.

23. The method of claim 22 further comprising the steps of: changing which of the at least two oscillatory signals are selected to provide the synchronization signal, and which of the remaining oscillatory signals are selected for resynchronization purposes.

24. The method of claim 23 further comprising the steps of: making changes in the selections of said oscillatory signals used for providing said synchronization signal and for said resynchronization purposes in response to a selected transition of the input signal following a first defined interval of time from the last change of said selections.

25. The method of claim 24 further comprising the steps of: selecting said first defined interval of time from the last change in the selections, such that each oscillatory signal selected for said resynchronization purposes is resynchronized prior to its frequency drifting more than a tolerable amount.

26. The method of claim 24 further comprising the steps of: selecting the interval of time from the last change in the selections, such that a different oscillatory signal is selected to provide the synchronization signal before the current oscillatory signal providing the synchronization signal drifts in phase with respect to the input signal more than a tolerable amount.

27. The method of claim 23 further comprising the steps of: changing selections of said oscillatory signals used for providing said synchronization signal and for said resynchronization purpose independently of any input signal transitions if no selected transitions of the input signal occurs following said first defined interval of time and prior to a second defined interval of time from the last change in selections, where the second defined interval of time is longer than the first defined interval of time.

28. The method of claim 27 further comprising the steps of: selecting a second interval of time from the last change in the selections, such that each oscillatory signal selected for said resynchronization purposes causes said resynchronization prior to its frequency drifting more than a tolerable amount.

29. The method of claim 24 further comprising the steps of: selecting said first defined interval of time from the last change in the selections, such that at least one oscillatory signal is selected for said resynchronization purposes, said selection causes resynchronization for at least the minimum amount of time required to achieve frequency synchronization with said reference periodic signal.

30. The method of claim 8 further comprising the step of: disabling the synchronization signal when said at least two oscillatory signals are being synchronized to said reference periodic signal during said gap in said input signal.

31. A method of producing a periodic signal at an output terminal, said periodic signal having a defined phase relationship with respect to input signal transitions having a given polarity, said method comprising the steps of:
providing a first and second oscillatory signal;
initially enabling the first oscillatory signal of said first and second oscillatory signals and disabling the second oscillatory signal of said first and second oscillatory signals;
disabling the currently enabled oscillatory signal of said first and second oscillatory signals and enabling the currently disabled oscillatory signal of said first and second oscillatory signals in response to said input signal transitions having the given polarity; and
providing the enabled oscillatory signal of the said first and second oscillatory signals to said output terminal.

32. The method of claim 31 further comprising the step of:
adjusting the frequency of each oscillatory signal to the frequency of a reference periodic signal.

33. The method of claim 32 further comprising the step of:
adjusting the frequency of all oscillatory signals in response to a transmission monitor signal.

34. The method of claim 32 further comprising the step of:
adjusting the frequency of all oscillatory signals at a given time relative to the input signal.

35. The method of claim 32 further comprising the step of:
providing at least one additional oscillatory signal, and wherein the frequency of said at least one oscillatory signal of said oscillatory signals is adjusted.

36. The method of claim 35 wherein at least one of said oscillatory signals is disconnected from the output terminal while the frequency of said at least one disconnected oscillatory signals is adjusted.

37. The method of claim 35 further comprising the step of:
assigning at least one oscillatory signal of the three or more oscillatory signals to be frequency adjusted and reassigning at least one oscillatory signal of at least one of the three or more oscillatory signals that was being frequency adjusted to be one or more of the oscillatory signals providing an oscillatory signal to the output terminal, said at least one oscillatory signal being assigned in response to a transmission monitor signal so that the frequency of the signal at the output terminal over multiple assignments is effectively an average of the frequencies of all of the three or more oscillatory signals.

38. The method of claim 37, wherein the at least one oscillatory signal is assigned in response to a transition in the input signal, said transition in said input signal having a given polarity, said assignment in response to said transition in said input signal occurring when the transmission monitor signal does not occur within a predetermined time, whereby continued exchange of oscillatory signals at the output terminal is assured.

39. The method of claim 35 further comprising the step of:
assigning one oscillatory signal of the three or more oscillatory signals that was providing an oscillatory signal to the output terminal to be frequency adjusted and reassigning an oscillatory signal that was being frequency adjusted to be one or more of the oscillatory signals providing an oscillatory signal to the output terminal, said assigned and reassigned oscillatory signals being assigned and reassigned in response to a periodic reference signal so that the frequency of the oscillatory signal at the output terminal over multiple assignments is effectively an average of the frequencies of all of the three or more oscillatory signals.

40. A method of producing a periodic signal at an output terminal, said periodic signal having a defined phase relationship with respect to an input signal, said input signals having transitions having a given polarity, said method comprising the steps of:
connecting and then disconnecting a first oscillatory signal that was enabled from the output terminal, said disconnecting being in response to an input signal transition having the given polarity and adjusting the frequency of said first oscillatory signal to the frequency of a reference periodic signal;

enabling a second oscillatory signal in response to an input signal transition having the given polarity, so that the oscillatory signal is enabled; and providing said second oscillatory signal to the output terminal.

41. An apparatus for producing a signal for synchronization with an input signal, said input signal having selectable transitions and said synchronization signal having a defined phase relationship with respect to the transitions of the input signal, the apparatus comprising:

a synchronization signal producing means consisting of at least two oscillator means generating respective oscillatory signals for producing the synchronization signal, a control means for selectively enabling one of said at least two oscillator means in response to a selected transition of said input signal, and a signal multiplexing means that logically combines the oscillatory signals generated by the at least two oscillator means into a single synchronization signal.

42. The apparatus of claim 41 further comprising: a resynchronization means that resynchronizes each of said at least two oscillator means to a reference periodic signal when said selectively enabled, an enabling means that selectively enables one of said at least two oscillator means so as to be connected to said resynchronization means, and an isolation means that prevents the remaining non-enabled of said at least two oscillator means from providing the synchronization signal.

43. The apparatus of claim 41 further comprising:

an enabling means that enables one of said at least two oscillator means to provide the synchronization signal in response to a transition of only a single selected polarity of the input signal.

44. The apparatus of claim 43 further comprising: a selection means that selects the single polarity of the input signal to be either positive or negative.

45. The apparatus of claim 42 further comprising:

an input signal gap determining means that determines when gaps exist in said input signal and enables one or more of the oscillator means to be synchronized to said reference periodic signal during the gaps of said input signal.

46. The apparatus of claim 42 further comprising:

a frequency control means that generates a frequency control signal that controls the frequency of said at least two oscillator means one at a time.

47. The apparatus of claim 46 further comprising:

a phase detector means for each of said at least two oscillator means that generates a phase difference signal by comparing the phase of the oscillatory signal generated by its respective oscillator means with said reference periodic signal; and a sample and hold means for each of said at least two oscillator means for generating the frequency control signal based on either the current or previously generated and held phase difference signal, said sample and hold means being arranged so that when its respective oscillator means is enabled to being synchronized to said reference periodic signal the sample and hold means generates the frequency control signal based on the current phase difference signal, said sample and hold means being further arranged so that when its respective oscillator means is disabled from being synchronized to said reference periodic signal the sample and hold means maintains the frequency control signal based on the last phase difference signal that was generated the last time said respective one of the at least two oscillator means was enabled to to be synchronized to said reference periodic signal.

48. The phase detector means for each of said at least two oscillator means in the apparatus of claim 47 further comprising: an initialization means that in response to the enabling signal generated by said enabling means initializes the difference in phase between the oscillatory signal generated by its respective oscillator means and the periodic reference signal such that the phase detector means detects an initial zero phase difference.

49. The apparatus of claim 45 further comprising:

a synchronization signal disabling means that disables the synchronization signal when all of the at least two oscillator means are being synchronized to said reference periodic signal.

50. The apparatus of claim 41 further comprising: a phase adjustment means that modifies the phase relationship between the input signal and the synchronization signal.

51. The apparatus of claim 50 further comprising:

a signal parallelizing means that converts serial data being carried in the input signal into parallel word wide output data and generates a synchronization signal that is different than said synchronization signal established by said selected transitions of said input signal and now has a defined phase relationship with respect to the parallel word wide output data.

52. The apparatus of claim 51 further comprising:

a start word detection means that searches for a defined pattern in the input signal that signifies the start of a transmission and/or the alignment of data words therein and generates a start words detected signal;

a serial to parallel conversion means that groups two or more data bits from the input signal into said parallel word wide data that are aligned with the serial data being carried in the input signal in response to the start words detected signal;

a word synchronization signal generation means that generates a jitter free word synchronization signal having a frequency which is the frequency of the synchronization signal of claim 40 divided by the number of said two or more data bits; and a word alignments means that aligns the parallel word wide data to be in a defined phase relationship to selected transitions of the jitter free word synchronization signal.

53. The apparatus of claim 50 further comprising:

a serial synchronization signal generation means that generates a second synchronization signal having selectable transitions that is jitter free and that is synchronized to the synchronization signal of claim 40; and a data signal alignment means that aligns the serial data of said input signal such that the serial data have a defined phase relationship with selected transitions of the second synchronization signal.

54. The apparatus of claim 50 wherein said synchronization signal has specific pulses and said input signal has specific transitions further comprising:

a correlation means that correlates said specific pulses of the synchronization signal with the specific input signal transitions so that said specific pulses of said synchronization and input signals are phase aligned with respect to each other.

55. The apparatus of claim 42 wherein said at least two oscillator means are of a number which is three or more and further comprising:

a selection-control means that selects a pair of from said three or more oscillator means to alternately provide said synchronization signal and selects one or more of the remaining oscillator means to be resynchronized with said periodic reference signal; and an input transition monitoring means that in response to a selected transition of the input signal alternates which of the pair from the three or more oscillator means is providing the synchronization signal.

56. The apparatus of claim 55 further comprising:

a selection changing means that changes which of the three or more oscillator means are selected to be the pair that is alternately providing the synchronization signal, and which of the three or more oscillator means are selected to be resynchronized to said periodic reference signal.

57. The apparatus of claim 56 further comprising:

a selection changing transition monitoring means that changes the selections in response to a selected transition of the input signal following a defined interval of time from the last change in the selection; and an internal timing means that defines a defined interval from the last change in selections such that each oscillator means selected for said resynchronization purposes causes resynchronization prior to its frequency drifting more than a tolerable amount.

58. The apparatus of claim 56 further comprising:

a timeout means for changing the selections of said three or more oscillator means independently of any input signal transitions if no selected transitions of the input signal occurs following a first defined interval of time and prior to the end of a second defined interval of time from the last change in the selections of said three or more oscillator means.

59. The apparatus of claim 42 further comprising:

a selection-control means that selects one of said at least two oscillator means to provide the synchronization signal and that selects one or more of the remaining oscillator means to be resynchronized with said periodic reference signal.

60. The apparatus of claim 59 further comprising:

a selection-changing means that changes which of the at least two oscillator means are selected for providing the synchronization signal, and which of the at least two oscillator means are selected to be synchronized to said periodic reference signal.

61. The apparatus of claim 60 further comprising:

a transition monitoring means that changes the selections of the at least two oscillator means in response to a selected transition of the input signal following a defined first interval of time from the last change in the selections.

62. The apparatus of claim 60 further comprising:

a selection-control-timeout means that changes the selections of said at least two oscillator means independently of any input signal transitions if no selected transitions of the input signal occurs following a first defined interval of time and prior to the end of a second defined interval of time from the last change in the selections of said at least two oscillator means, said second defined interval of time being longer than the first defined interval of time.

63. A circuit providing an oscillatory signal from a pair of gated variable-frequency oscillators each having an output that can be connected to a logic hazard avoidance circuit, said logic hazard avoidance circuit comprising a NOR circuit accepting each of said outputs of said gated variable-frequency oscillators and providing an output in response to either of said inputs.

64. Apparatus for producing a periodic signal at an output terminal, said periodic signal having a defined phase relationship with respect to an input signal, said input signal having transitions having a given polarity, said apparatus comprising:

first and second means for selectively providing first and second oscillatory signals so that initially said first oscillatory signal is selected and said second oscillatory signal is not selected and subsequently said second oscillatory signal is selected and said first oscillatory signal is not selected, said initial and subsequent selections being repeated thereon in response to said input signal transitions having said given polarity; and third means for providing said first or second oscillatory signal to the output terminal.

65. The apparatus of claim 64 further comprising:

fourth and fifth means for adjusting the frequency of said first and second oscillatory signals, respectively, to the frequency of a reference periodic signal.

66. The apparatus of claim 65 wherein said fourth and fifth means also includes:

control means responsive to a transmission monitor signal for adjusting the frequency of said oscillatory signals in response to said transmission monitor signal.

67. The apparatus of claim 65, wherein said fourth and fifth means also includes:

control means for adjusting the frequency of said oscillatory signals at a given time relative to the input signal.

68. The apparatus of claim 65 further comprising:

sixth and seventh means for producing a third oscillatory signal and adjusting the frequency of said third oscillatory signal, respectively, and wherein said third means includes:

control means for selectively assigning one at a time at least one oscillatory signal of said oscillatory signals to be adjusted.

69. The apparatus of claim 68, wherein said third means includes means for disconnecting each of said first and second oscillatory signals from the output terminal while the frequency of said one oscillatory signal is adjusted.

70. The apparatus of claim 68, wherein said third means includes control means responsive to a transmission monitor signal for assigning an oscillatory signal of said first and second oscillatory signals to be adjusted in response to said transmission monitor signal, so that the frequency of the signal at the output terminal over multiple assignments is effectively an average of the frequencies of all said oscillator signals.

71. The apparatus of claim 70, wherein said control means is responsive to said input signal transition having said given polarity, said control means assigning an oscillatory signal of said first and second oscillatory signals to be adjusted in response to said transition, said assignment in response to said transition having said given polarity occurring when said transmission monitor signal does not occur within a predetermined time, whereby continued exchange of oscillatory signals at the output terminal is assured.

72. The apparatus of claim 68, wherein said third means includes control means for assigning an oscillatory signal of said first and second oscillatory signals that was providing an oscillatory signal to the output terminal to be adjusted and reassigning an oscillatory signal of said first and second oscillatory signals that was being adjusted to be one of the oscillatory signals providing an oscillatory signal to the output terminal, said assigned and reassigned oscillatory signals being assigned and reassigned in response to a periodic reference signal so that the frequency of the oscillatory signal at the output terminal over multiple assignments is effectively an average of the frequencies of said first and second oscillatory signals.

73. Apparatus for producing a periodic signal at an output terminal, said periodic signal having a defined phase relationship with respect to an input signal, said input signal having transitions having a given polarity, said apparatus comprising:

means for connecting and disconnecting a first oscillatory signal to and from the output terminal in response to a first of said input signal transition having said given polarity and adjusting the frequency of said first oscillatory signal to the frequency of a reference periodic signal;

means for enabling a second oscillatory signal in response to said input signal transition having a second of said given polarity, so that the second oscillatory signal is enabled; and means for providing said second oscillatory signal to the output terminal.

74. A circuit providing a periodic signal at its output terminal, said periodic signal having a defined phase relationship with respect to input signal, said input signal having transitions having a given polarity, said circuit comprising:

a bistable device adapted to receive the input signal, said bistable device having alternatively occurring first and second outputs, said bistable device providing a signal alternately at said first and second outputs in response to said input signal transitions having the given polarity; and a first and second variable-frequency oscillators, each of said first and second variable-frequency oscillators having an enabling input, a frequency control input, and a gated output, each enabling input of said first and second variable-frequency oscillators being connected to a respective output of said bistable device so that the gated output of one of said variable-frequency oscillators is enabled when the gated output of the other variable-frequency oscillator is not enabled.

75. The circuit of claim 74 further comprising:

first and second phase-locked loops, each loop having a first input connected to a respective gated output of said first and second variable-frequency oscillators, a second input connected to a reference periodic signal and an output connected to the frequency control input of a respective variable-frequency oscillator.

76. The circuit of claim 75 further comprising:

a control gate connected to interrupt the operation of respective phase-locked loop in response to a transmission monitor signal, said control gate having first and second inputs with said first input connected to a transmission monitor signal and an output connected to a respective phase detector.

77. The circuit of claim 76 wherein said second input of said control gate is connected to a respective crated output of its respective variable-frequency oscillator.

78. The circuit of claim 76 wherein said second input of said control gate is connected to said gated output of a respective variable-frequency oscillator.

79. The circuit of claim 74 further comprising:

output logic connected so as to selectively connect said gated output of each variable-frequency oscillator to the output of said circuit so that only one gated output of each variable-frequency oscillator is connected to the output of said circuit at a time.

80. The circuit of claim 79, wherein said output logic includes a gate providing a Boolean OR output of said gated outputs.

81. The circuit of claim 79, wherein said output logic includes a gate providing a Boolean NOR output of said gated outputs.

82. The circuit of claim 81, wherein each variable-frequency oscillator has an ungated oscillatory signal tap connected to an input of a hazard avoidance gate, said hazard avoidance gate providing a Boolean NOR output of said ungated inputs, and an output of said hazard avoidance gate is connected to an input of said output logic NOR gate.

83. A circuit providing a periodic signal at its output, said periodic signal having a defined phase relationship with respect to an input signal, said input signal having transitions of a given polarity, said circuit comprising:

a bistable device adapted to receive the input signal, said bistable device having alternatively occurring first and second outputs, said bistable device providing a signal alternately at said first and second outputs in response to input signal transitions having the given polarity;

first, second and third variable-frequency oscillators, each of said first, second and third variable-frequency oscillators having an enabling input, a frequency control input, and a gated output;

first, second and third phase-locked loops, each first, second and third phase-locked loops having a first input connected to a respective gated output of said first, second and third variable-frequency oscillators, a second input connected to a reference periodic signal and an output connected to said frequency control input of a respective variable-frequency oscillator; and selection logic connected to said outputs of said bistable device and to said enabling inputs of said variable-frequency oscillators, so that said first and second outputs of said bistable device are selectively connected to said first, second and third variable-frequency oscillators through said selection logic, said selection logic selectively assigning the first and second outputs of said bistable device to respective enabling inputs of a pair of said variable-frequency oscillators.

84. The circuit of claim 83, wherein said selection logic is also connected to a transmission monitor signal, said selection logic being arranged so as to reassign the gated output of a variable-frequency oscillator in such a manner as to provide a signal to the circuit output's and disconnect the gated output of another variable-frequency oscillator from the circuit's output in response to said transmission monitor signal, said selection logic providing said reassignment and disconnection of said gated output so that the frequency of the signal at the circuit's output over multiple reassignments is effectively an average of the frequencies of said first, second and third variable-frequency oscillators.

85. The circuit of claim 84, wherein said selection logic is also connected to reference periodic signal in such a manner so that one of said three variable-frequency oscillators is reassigned in response to said input signal transition of said given polarity when said transmission monitor signal does not occur within a predetermined time, whereby continued reassignment and disconnection off said oscillatory signals of said first, second and third variable-frequency oscillators at the circuit's output is assured.

86. The circuit of claim 83, wherein said selection logic is also connected to reference periodic signal so that one of said three variable-frequency oscillators is reassigned in response to said transition of the given polarity of said input signal, said selection logic providing said reassignment when said reference periodic signal indicates that a predetermined time has elapsed so that the frequency of the signal at the circuit's output over multiple reassignments is effectively an average of the frequencies of said first, second and third variable-frequency oscillators.

87. A circuit producing a periodic signal at its output, said periodic signal having a defined phase relationship with respect to an input signal, said input signal having transitions having a given polarity, said circuit comprising:

a bistable device adapted to receive the input signal, said bistable device having alternatively occurring first and second outputs, said bistable device providing a signal alternately at said first and second outputs in response to said input signal transitions having the given polarity;

first and second variable-frequency oscillators, each of said first and second variable-frequency oscillators having an enabling input, a frequency control input, and a gated output providing a respective gated oscillatory signal;

a gate connected between the output of each variable-frequency oscillator and the circuit's output;

selection logic connected for selectively connecting said outputs of said bistable device to said enabling inputs of said first and second variable-frequency oscillators, and connected to said gated output of said first and second variable-frequency oscillators so as to disconnect said enabling input of one variable-frequency oscillator from an output of said bistable device and disconnect a respective first oscillatory signal from the circuit's output in response to said input signal transition having the given polarity, and to connect said enabling input of the other variable-frequency oscillator to an output of said bistable device and connect a respective second oscillatory signal to the circuit's output in response to said input signal transition having the given polarity, so that one variable-frequency oscillator is connected to the circuit's output when another variable-frequency oscillator is disconnected from the circuit's output; and a respective phase lock loop connected to said frequency control input of each said first and second variable-frequency oscillators and to said selection logic so as to adjust the frequency of each said first and second variable-frequency oscillators to the frequency of a reference periodic signal while said another variable-frequency oscillator is disconnected from said output of said circuit.

* * * * *